Nov. 1, 1960 R. D. JAMES ET AL 2,958,477

DATA PLAYBACK UNIT AND CIRCUIT

Original Filed Nov. 9, 1953 3 Sheets-Sheet 1

INVENTORS:
RICHARD D. JAMES
WALTER A. JONES

By Willard M. Mahan
AGENT

DATA PLAYBACK UNIT AND CIRCUIT

Original Filed Nov. 9, 1953 3 Sheets-Sheet 2

INVENTORS:
RICHARD D. JAMES
WALTER A. JONES
By Willard M. Graham
AGENT

Nov. 1, 1960 R. D. JAMES ET AL 2,958,477

DATA PLAYBACK UNIT AND CIRCUIT

Original Filed Nov. 9, 1953 3 Sheets-Sheet 3

INVENTORS:
RICHARD D. JAMES
WALTER A. JONES
By Willard M. Graham
AGENT

United States Patent Office 2,958,477

Patented Nov. 1, 1960

2,958,477

DATA PLAYBACK UNIT AND CIRCUIT

Richard D. James, Manhattan Beach, and Walter A. Jones, Santa Monica, Calif., assignors to Northrop Corporation, a corporation of California Original application Nov. 9, 1953, Ser. No. 391,074, now Patent No. 2,860,199, dated Nov. 11, 1958. Divided and this application Aug. 12, 1958, Ser. No. 761,275

1 Claim. (Cl. 242—55.12)

This application is a division of our copending application Serial No. 391,074, filed November 9, 1953, for a data playback unit and circuit, now Patent No. 2,860,-199, issued November 11, 1958.

This invention relates generally to perforated tape playback means and more particularly to a multiple channel, perforated metallic tape, precision playback unit.

Data can be recorded on tape by means of a series of punched holes made in the tape and spaced longitudinally along the length thereof in a suitable timewise relationship. This data can be reproduced by playing back the tape in a device which can detect or read the data from the tape. The signals thus derived can be used to perform certain functions, usually, for example, to operate control mechanisms. When precise control is critical, the data must be accurately and surely reproduced to avoid large control errors.

It is an object of this invention to provide means for reproducing data, recorded on steel tape in the form of punched holes, with maximum reliability.

Another object of the invention is to provide means for dynamically regulating the tension of perforated tape being played back for reproduction.

And another object of this invention is to provide means for advancing or retarding the speed of moving tape being played back on the unit.

Still further objects and features of the invention will hereinafter appear from the following specification read in conjunction with the accompanying drawings which illustrate presently preferred embodiments of the invention.

With these and other objects in view, the invention comprises a playback unit having a perforated steel tape, for example, provided on a supply reel and driven by a sprocket around a tensioning roller, through a compact, rod actuated readout head having multiple layers of switches at different levels, and rewound on a takeup reel driven by a motor through a slip clutch. A friction clutch provides a fixed load to the rotation of the supply reel. The sprocket is motor driven through one input of a differential, the other input of which can be driven by another motor to control the speed of the sprocket.

Figure 1:
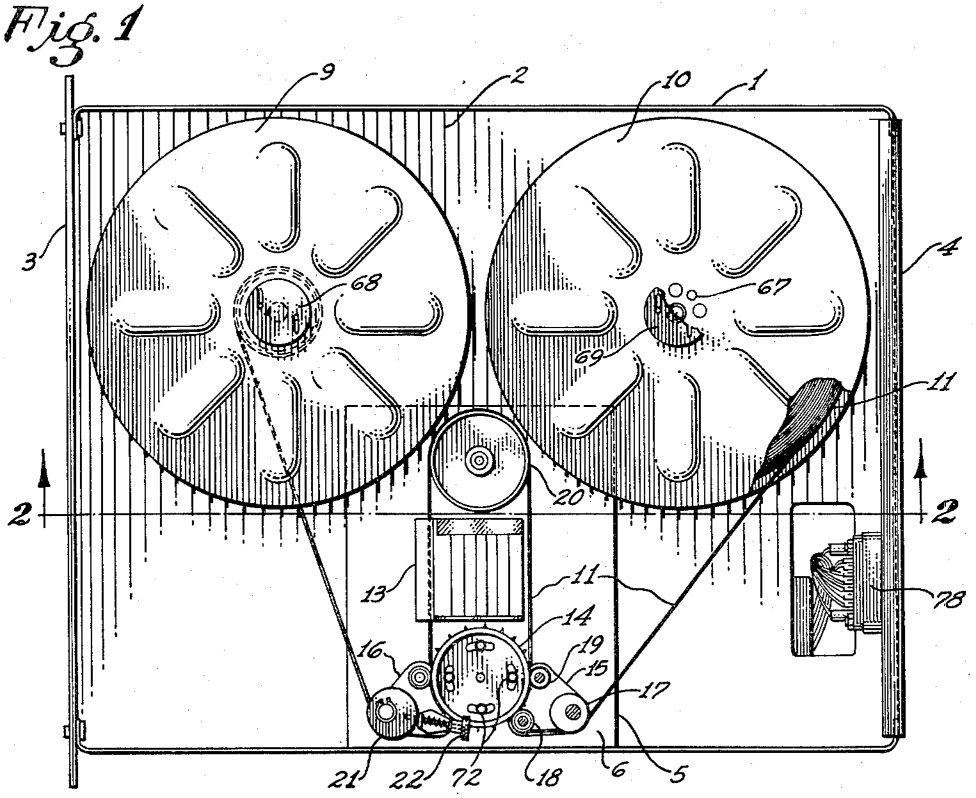
Figure 1 is a top plan view of the data playback unit.

Referring to Figure 1, there is shown a plan view of a preferred construction of a data playback unit. The unit comprises a frame 1 to which are mounted different elements of the playback unit. The frame 1 is fabricated with a base plate 2 suitably secured to side plates 3 and 4 at a distance somewhat greater than halfway below the top edges of plates 3 and 4. This is more clearly shown in Figure 2 which is a sectional view of the playback unit along line 2—2. Base plate 2 has a central cutout 5 in the fore area thereof to accommodate a heavier, flanged support plate 6. This support plate 6 is attached flat with base plate 2 to channels 7 and 8 which are, in turn, fastened to base plate 2. A takeup reel 9 is located above channel 7 and a supply reel 10 carrying a perforated steel tape 11 is positioned over channel 8. The steel tape 11 is perforated with a series of data holes 12, of which there can be a maximum of 24, for example, in a row. These holes 12 represent data which is read by a readout head 13 when the steel tape 11 is passed through the head 13.

The steel tape 11 is driven by a sprocket 14 against which the tape 11 is pressed by roller assemblies 15 and 16. The tape 11 is passed around a pivot roller 17 of assembly 15 immediately as it leaves supply reel 10 and is held against sprocket 14 by smaller rollers 18 and 19. The tape 11 is then passed around a tape tensioning roller drum 20, through the readout head 13 and around roller assembly 16 to takeup reel 9. The roller assembly 16 is eccentrically pivoted like roller assembly 15 and can be moved away from sprocket 14 by turning a knurled cap 21 which is eccentrically secured to the pivot roller. The roller assembly 16 is locked in a fixed position by a spring loaded pin 22 engaging with cap 21 when the assembly 16 is placed in correct operating position. A similar cap and locking pin are provided for the assembly 15 but have been omitted from Figure 1 for clarity.

Figure 3:
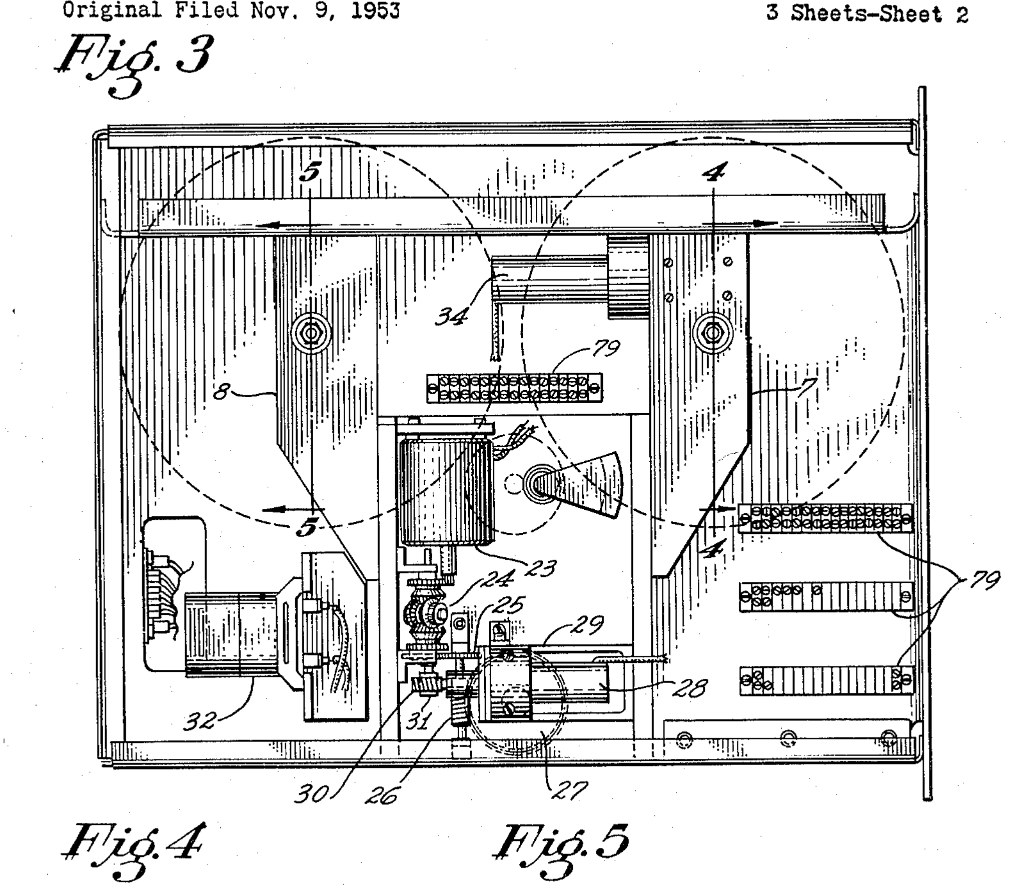
Figure 3 is a bottom plan view of the data playback unit.

The sprocket 14 which drives the tape 11 is driven by a synchronous motor 23 through gearing as shown in Figure 3. In this figure, motor 23 works through one input of a differential 24 to drive gear 25 (differential output) which is pinned to the shaft of worm gear 26. The worm gear 26 meshes with a larger gear 27 which is secured directly to the drive shaft of sprocket 14. The speed at which the tape 11 is moved can be increased or decreased by energizing a D.C. motor 28. Motor 28 is cradled in a support bracket 29 which extends over the gear 27 such that a worm gear 30 axially secured to the drive shaft of motor 28 meshes with gear 31 pinned to the drive shaft of differential 24 for another input thereto. Motor 28 can thus advance or retard the motion of sprocket 14 by rotating gear 31 (the second input) of differential 24 about the differential 24 axis thereby changing the differential output speed.

The synchronous motor 23 can be a two phase motor wherein a capacitance 32 is connected in series with one of the phase windings and connected across the same A.C. power source as is the other phase winding. This motor 23 through sprocket 14 works against the load of the perforated tape on the supply reel 10 and a clutch 33 (Figure 2) presenting a fixed friction load. The tape 11 is rewound on takeup reel 9 after passing through the readout head 13 by a D.C. motor 34 working through a slip clutch 35. These clutches are shown in detail in Figures 4 and 5 which are cross-sectional views of the two clutches.

Figure 4:
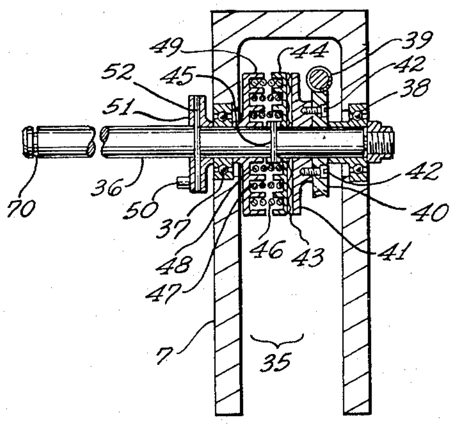
Figure 4 is a cross-sectional view on the line 4—4 of Figure 3.

In Figure 4, shaft 36 is mounted in channel 7 by frictionless bearings 37 and 38 as shown. Worm gear 39 driven by D.C. motor 34 meshes with a gear 40 which is secured to clutch plate 41 by screws 42. A corprene (neoprene and cork composition) clutch facing 43 working against clutch plate 41 drives the shaft 36 via pin 45 engaging with the slotted hub of flanged clutch plate 44. The hub is slotted to permit axial movement of clutch plate 44. The multiple flanged clutch plate 44 compresses the clutch facing 43 through action of three concentric expansion springs 46, 47 and 48 of increasing diameters located between the flange rings shown. These springs are braced against a similar multiple flanged clutch plate 49 having concentric flange rings to separate the concentric springs. Thus, the takeup reel 9, placed on shaft 36, is locked by a short pin 50 on disk 51 which is, in turn, pinned to shaft 36 by a pin 52, can be driven by D.C. motor 34 through slip clutch 35 to rewind tape 11 smoothly on the reel 9.

Figure 5:
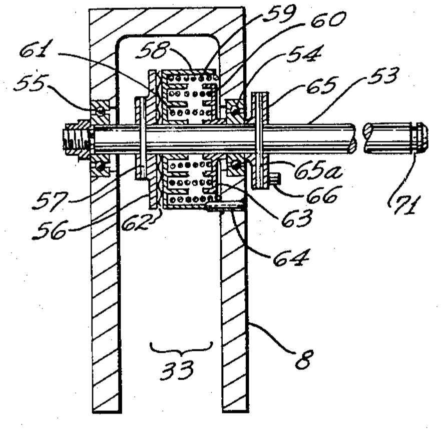
Figure 5 is a cross-sectional view on the line 5—5 of Figure 3.

Referring now to Figure 5, shaft 53 is mounted in channel 8 on frictionless bearings 54 and 55. Clutch plate 56 is pinned to shaft 53 by a pin 57. Multiple flanged clutch plate 58, having concentric flange rings to separate three expansion springs 59, 60 and 61 is forced by these springs to bear against plate 56 through a corprene friction facing 62 as shown. These springs are braced against a similar multiple flanged clutch plate 63 having concentric flange rings to separate the concentric springs. The first flanged clutch plate 58 is restrained from movement by a pin 64 which is embedded in the channel 8. The supply reel 10 mounted on shaft 53 rests on a disk 65 and is locked to disk 65 by a short pin 66. The disk 65 is secured to shaft 53 by pin 65*a*. In this way, a constant friction load is provided through the clutch 33 such that the supply reel 10 presents a continuous, non-slipping load to the sprocket drive.

The short pin 66 locks shaft 53 to supply reel 10 by mating with a hole such as 67 (Figure 1) located in the reel near the reel axis. The reels 9 and 10 are secured in place on shafts 36 and 53 by reel lock caps 68 and 69 respectively. These caps are positive locking devices which carry spring loaded blades that engage channels 70 and 71 cut near the top of shafts 36 and 53.

Another feature of the playback unit is that sprocket 14 can be adjusted slightly to position the tape by loosening screws 72 which secure the sprocket drum to the sprocket drive shaft.

Figure 2:
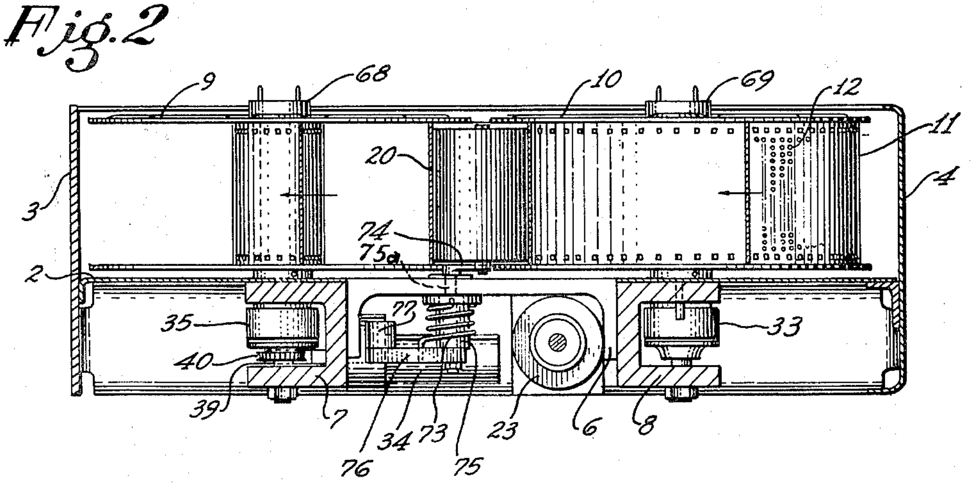
Figure 2 is a cross-sectional view on the line 2—2 of Figure 1.

The tensioning roller drum 20, as shown in Figures 1 and 2, having an axis parallel to the mounting axes of the reels 9 and 10, is rotatably mounted on the free end of a first radius arm 74. This radius arm 74 is fixed at its other end to a tensioning shaft 75*a* which is rotatably mounted in a bearing sleeve 75 secured in the support plate 6, so that the tensioning shaft 75*a* is also parallel to the reel axes. A second radius arm 76 extends from shaft 75*a* in a direction 180 degrees from first radius arm 74, and carries a weight 77 at the outer end thereof. A preloaded torsion spring 73 is secured at one end to a shoulder of bearing sleeve 75 and at the other end to second radius arm 76, so that the roller drum 20 is thus spring-loaded away from the readout head 13. In correct operating position, the radius arm 74 carrying roller drum 20 is approximately perpendicular to the tape loop coming to and from the drum. Since the two arms are rigidly attached to the same tensioning shaft 75*a* borne by sleeve 75, an external acceleration tending to cause roller drum 20 to swing forward, for example, and thereby slacken tape 11 would also tend to cause the weight 77 to swing forward which, because of the 180 degree separation of radius arms, counteracts acceleration effects on the playback unit. This is desirable to prevent malfunction of equipment when carried in aircraft, for example, where high accelerations can be encountered.

Power is supplied through a single receptacle 78 (Figure 1) which also provides enough pins for wiring to all the information channels of the readout head 13. Terminal strips 79 (Figure 3) are provided to facilitate wiring installation.

The readout head 13 is shown, described, and claimed in our aforesaid Patent No. 2,860,199.

Figure 6:
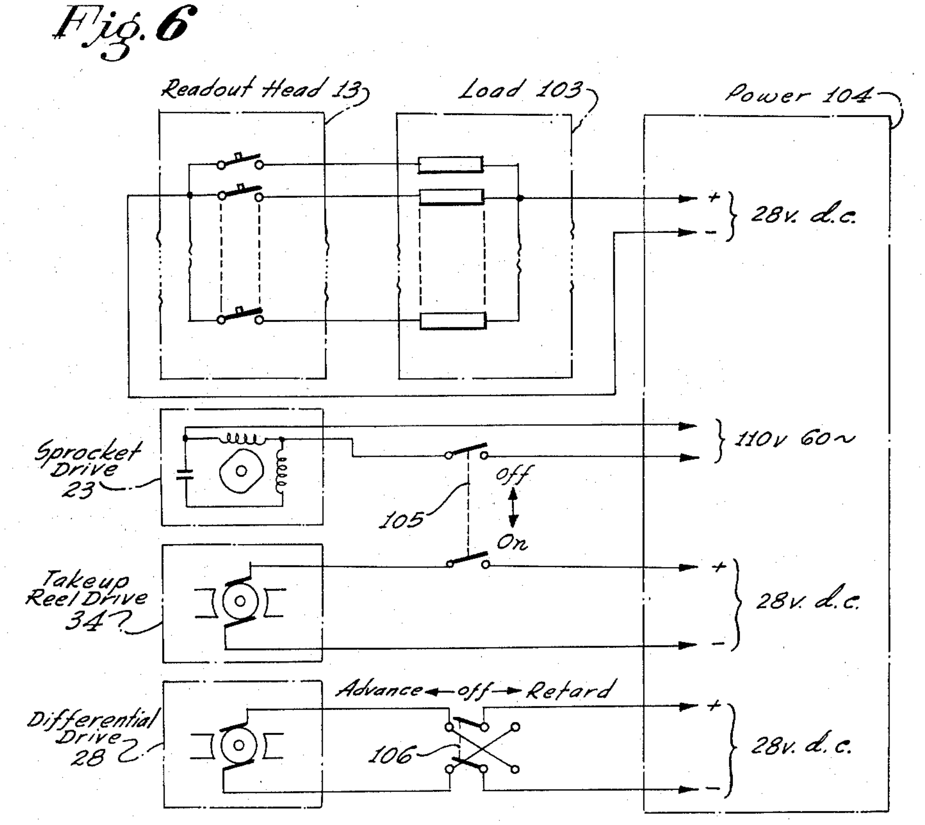
Figure 6 is a wiring diagram illustrating the control circuit for the data playback unit.

The control circuit for the data readout unit is shown in Figure 6. Three of the switches of the readout head 13 are drawn. Each of these switches is connected in series to a load 103 and the free ends are connected together across 28 volts D.C. of power supply 104 as shown. The load 103 can be a plurality of stepper motors, for example, each connected to drive a mechanical load. The readout unit is turned on and off by means of a double pole switch 105. The switch 105 connects 110 volts A.C. power to the sprocket drive motor 23 and 28 volts D.C. to the takeup reel drive motor 34. The tape 11 can be speeded up or slowed down by operating a double pole, double throw switch 106. By placing the switch 106 in the advance position, differential drive motor 28 is connected to 28 volts D.C. to rotate in one direction. When switch 106 is placed in the retard position, the leads to motor 28 are reversed, thereby reversing the direction of rotation of motor 28. The speed of the motor 28 in driving the second input of differential 24 can thus be added to or subtracted from the sprocket drive speed.

Thus, there is provided a data playback unit which is characterized primarily by an extreme preciseness and reliability of operation. Means to advance or retard tape motion were provided as well as means for maintaining correct dynamic tape tension.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claim.

What is claimed is:

In a data playback unit, a rotatable supply reel adapted to carry a tape wound on said supply reel, a rotatable takeup reel, means for driving tape off said supply reel through a readout head and onto said takeup reel, and means for maintaining correct dynamic tension on the tape between said reels, said latter means comprising a roller drum positioned for having substantially a half loop of tape wrapped therearound, a perpendicular shaft rotatable about a fixed axis on said playback unit, a first horizontal radius arm rigidly attached to said shaft, said drum perpendicularly and rotatably mounted on the end of said first radius arm, said shaft being parallel to the rotation axis of said drum, a second horizontal radius arm rigidly attached to said shaft and extending therefrom at 180 degrees from said first radius arm, said second radius arm mounting a weight at the extended end thereof, a spring positioned on said unit and urging said roller drum to bear outwardly against the tape loop, whereby external acceleration on said playback unit tending to cause relative inertial motion of said roller drum is counteracted by reaction of said weight on the opposite side of said shaft from said drum.

References Cited in the file of this patent

UNITED STATES PATENTS

| | | |
|---|---|---|
| 2,433,194 | Bedford et al. | Dec. 23, 1947 |
| 2,578,015 | Reinhard | Dec. 11, 1951 |
| 2,705,599 | McCollough | Apr. 5, 1955 |
| 2,745,604 | Masterson | May 15, 1956 |